Jan. 29, 1952  R. M. ROWELL ET AL  2,583,798
POWER FACTOR AND PHASE ROTATION HOOK ON METER
Filed Nov. 14, 1949  2 SHEETS—SHEET 2
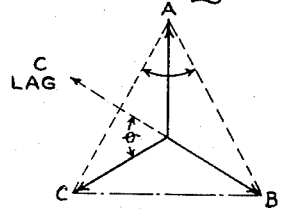
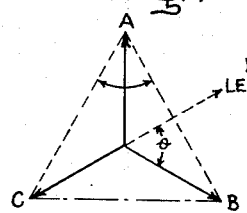
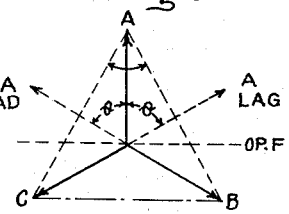
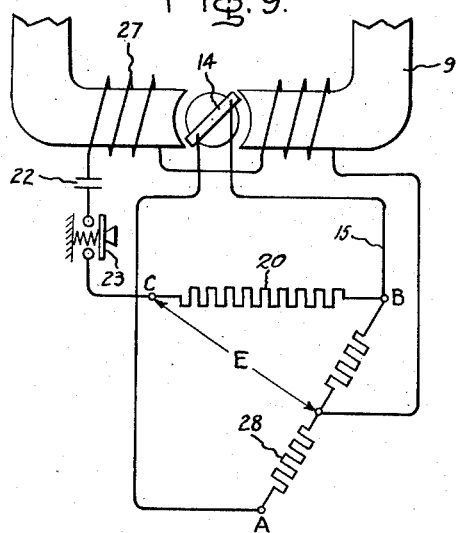
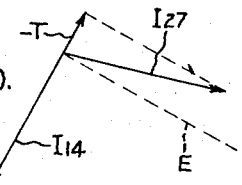
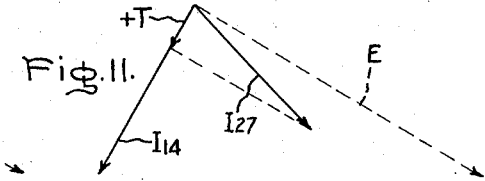
Inventors:
Ralph M. Rowell,
Arnold L. Nylander,
by Russell A. Warner
Their Attorney.

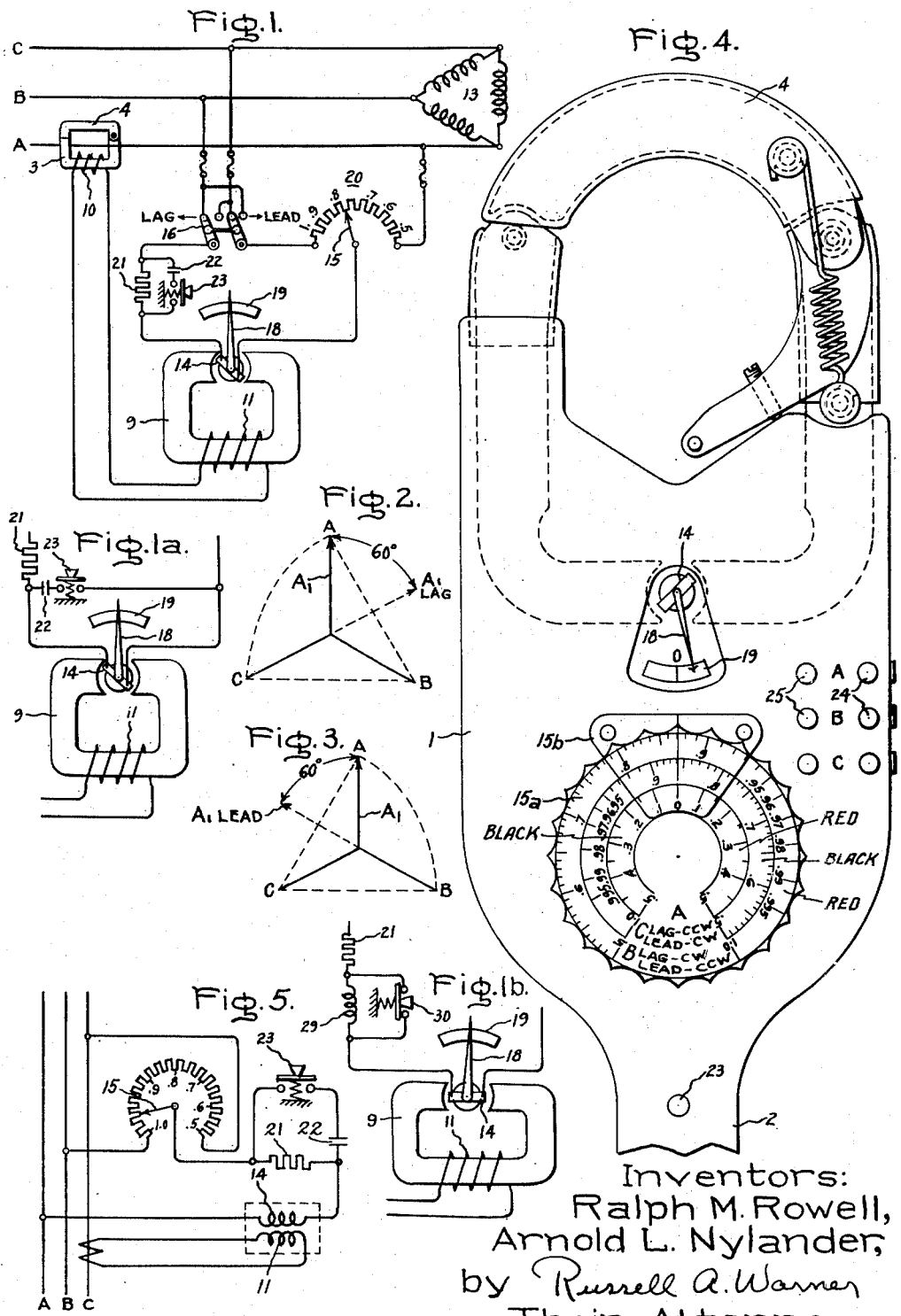

Patented Jan. 29, 1952

2,583,798

UNITED STATES PATENT OFFICE 2,583,798

POWER FACTOR AND PHASE ROTATION HOOK ON METER

Ralph M. Rowell, Lynn, and Arnold L. Nylander, Swampscott, Mass., assignors to General Electric Company, a corporation of New York Application November 14, 1949, Serial No. 127,108

5 Claims. (Cl. 172—245)

Our invention relates to a combined power-factor and phase-rotation meter for three-phase circuits and may be considered as an improvement over the power-factor meter described in United States Patent No. 2,519,071, August 15, 1950, Rowell, assigned to the same assignee as the present invention.

The above-identified patent describes a power-factor meter for three-phase circuits which will measure three-phase power factor. However, in order to know whether the power factor as thus measured is leading or lagging, it is necessary to know the phase rotation of the three-phase circuit being metered, and such patent assumes that this is known as, for example, by measurement with a separate phase-rotation indicating instrument.

The object of our invention is to equip power-factor meters of the character described in the above-mentioned patent with auxiliary equipment arranged so that the same apparatus may be used to measure both phase rotation and power factor, or, stated in another way, to indicate whether the power factor measured by such apparatus is leading or lagging, without the use of a separate phase-rotation indicator.

The features of our invention which are believed to be novel and patentable will be pointed out in the claims appended hereto. For a better understanding of our invention reference is made in the following description to the accompanying drawings in which Fig. 1 represents a circuit diagram of one embodiment of our combined power-factor and phase-rotation meter. Figs. 1a and 1b represent modifications that may be substituted in Fig. 1. Figs. 2 and 3 are vector diagrams explanatory of the power-factor measuring use of the apparatus of Fig. 1. Figs. 4 and 5, respectively, represent the structure and wiring diagram of a preferred embodiment of our invention. Figs. 6, 7, and 8 are vector diagrams explanatory of the power-factor use of the apparatus of Figs. 4 and 5. Fig. 9 is a modified form of the invention employing a compensating coil on the magnetic circuit of the wattmeter, and Figs. 10 and 11 are vector diagrams explanatory of Fig. 9.

Referring to Fig. 1, A, B, and C represent a three-phase power supply and 13 a load which is supplied thereby. A hook-on power-factor meter of a type described in the above-identified patent is shown connected to the three-phase circuit for the purposes of measuring the power factor. Such meter may consist of a single-phase wattmeter element represented as having a magnetic field circuit 9 and energizing coil 11 energized in response to the current in phase A of the power circuit through a hook-on current transformer, the hinged magnetic core parts of which are shown at 3 and 4 and the secondary winding at 10. The wattmeter is provided with a cylindrical iron core in the air gap of magnetic circuit 9 and a single moving coil 14 surrounding such core in such air gap, and with a pointer 18 and a zero center scale 19. The moving coil 14 is energized from the voltage of the three-phase circuit through a potentiometer 20 connected across two phases of the power circuit and through a reversing switch 16 and current limiting resistance 21. In the position of switch 16 shown, and marked "Lag," coil 14 is energized from phase B and the moving arm 15 of the potentiometer, and the resistance of the potentiometer is connected across phases A and C. In the other position of reversing switch 16 marked "Lead," the potentiometer resistance would be connected across phases A and B, while phase C would connect to the moving coil 14 through resistance 21.

The potentiometer resistance is provided with a power-factor scale on which the moving arm 15 indicates, and power factor is measured by positioning the reversing switch 16 and potentiometer arm 15 in such positions that the wattmeter reads zero, and then reading power factor from the position of arm 15 on the power-factor scale.

The theory of measurement is explained with the aid of vector diagrams, Figs. 2 and 3. Fig. 2 represents the vector diagram for the connections represented in Fig. 1. The vector $A_1$ is assumed to represent the current in line A; A—B the voltage between lines A and B; B—C the voltage between lines B and C, etc., at unity power factor.

With the switch 16 as shown and the potentiometer tap 15 set at unity power factor at the extreme left of the potentiometer resistance, the voltage applied to coil 14 of the wattmeter will be that across lines B—C, and the wattmeter will read zero since the current and voltage applied thereto are 90 degrees out of phase as represented in Fig. 2. Now let us assume that the current A lags because of an inductive load. If the potentiometer tap 15 is still set at unity power factor, the phase angle between current and voltage in the wattmeter would change and the wattmeter will deflect. By moving the tap 15 to the right, the vector B—C, Fig. 2, is rotated clockwise until the 90-degree relation is again established and the wattmeter reads zero. If the current A lags by 60 degrees, also represented in Fig. 2 by "A₁ Lag" corresponding to a .5 power factor, it will be necessary to move the potentiometer tap 15 to the extreme right of its resistance to obtain zero wattmeter deflection. This would connect the voltage coil of the wattmeter across lines A and B and establish the 90-degree relation represented between line "A₁ Lag" and vector A—B. The potentiometer may thus be calibrated in power factor and will indicate power factor, when adjusted, to cause a null or zero wattmeter reading. In case the power factor becomes leading, it will be impossible to obtain a zero wattmeter reading with any adjustment of the potentiometer, and it is then necessary to operate the reversing switch 16 to the indication "Lead." In this connection the wattmeter potential coil is connected across phase B—C when the potentiometer is at the unity power-factor position, and across A—C when at the .5 power-factor position. Fig. 3, "A₁ Lead" indicates a 60-degree leading power-factor condition for the current A₁ 90 degrees from voltage vector A—C. The wattmeter will thus read zero when the potentiometer is adjusted to the .5 power-factor position and will read zero for higher leading power-factor conditions with corresponding intermediate adjustments of the potentiometer between 1.0 and .5. Thus, the single power-factor scale and potentiometer, together with the reversing switch 16, enable the accurate measurement of all power factors not less than .5 leading or lagging. It is assumed that the three-phase circuit is balanced, and that the proper predetermined direction relation between the current and voltage circuits of the wattmeter exists.

In the above discussion it was assumed that the phase rotation of the power circuit was ACB, or counterclockwise in Figs. 2 and 3. If this assumption is wrong and the phase rotation is actually clockwise, or ABC in Fig. 2, the power-factor measurements which were thought to be leading will be lagging and vice versa. Hence, it is necessary to know the phase rotation and this, of course, may be measured by a separate phase-rotation indicator such, for example, as described in United States Patent No. 2,027,864, January 14, 1936; and the voltage connections to C and B reversed to reverse the phase rotation of the meter connections, if necessary, to make the "Lead" and "Lag" markings on switch 16 correct.

Our invention makes it unnecessary to employ a separate phase-rotation meter to ascertain the phase rotation. We employ the same equipment and add thereto only an impedance, illustrated by the condenser 22, and a switch, illustrated by the normally open push button switch 23, in shunt to resistance 21. To ascertain the phase rotation, the apparatus is connected the same as before for power-factor measurement, and a power-factor measurement is obtained by adjustment of potentiometer arm 15 and, if necessary, a reversal of switch 16 to obtain a zero wattmeter deflection. Assume that this is obtained with the reversing switch to the left or "Lag" position. Push button switch 23 is now closed momentarily to connect condenser 22 in parallel with resistance 21 in series with coil 14. This will advance the phase of the voltage impressed upon the voltage coil 14 of the wattmeter, and if the current of phase A is lagging as for a correct lagging power-factor measurement, the angle between current and voltage in the wattmeter will be increased above 90 degrees and the wattmeter pointer will deflect to the left of zero center or down-scale, and will indicate that the connections and markings of the meter correspond to such phase rotation of the circuit or counterclockwise in Fig. 2. On the other hand, if the current in phase A is leading, the angle between current and voltage in the wattmeter will decrease below 90 degrees when the push button switch 23 is closed, and the wattmeter pointer will deflect to the right of zero center or up-scale and will indicate that the phase rotation of the circuit as represented in Fig. 2 is clockwise, and that the pointer 15 indicates leading instead of lagging power factor, when the switch 16 is to the left in the position marked "Lag." Such a situation may be corrected by simply reversing the connections between switch 16 and the lines C and B.

Fig. 1a shows an alternative way of connecting an impedance, illustrated by the condenser 22, and push button switch 23. Here the phase-rotation testing circuit is in shunt to coil 14. The remainder of the apparatus omitted from Fig. 1a will be like that shown in Fig. 1. The operation of Fig. 1a is also similar to Fig. 1, except that in Fig. 1a the capacitor 22 when connected in circuit retards the phase of the voltage impressed upon coil 14 so that in the lead—lag determination an increasing power-factor scale reading indicates lag, and a decreasing scale reading indicates lead. Fig. 1a has the advantage over Fig. 1 of not short-circuiting the current-limiting resistor 21 in the event of capacitor breakdown. A similar change could be made in Fig. 5.

Fig. 1b shows another alternative way of connecting an impedance, illustrated by the inductance coil 29, and a switch 30. Here the phase-rotation testing circuit is in series with coil 14. The remainder of the apparatus omitted from Fig. 1b will be like that shown in Fig. 1. The operation of Fig. 1b is also similar to Fig. 1, except that in Fig. 1b the inductance 29, when connected into the circuit by opening the normally closed switch 30, retards the phase of the voltage impressed upon coil 14 so that in the lead-lag determination an increasing power-factor scale reading indicates lag, and a decreasing scale reading indicates lead. Fig. 1b has the advantage over Fig. 1 of not short circuiting the current limiting resistor 21 in the event of capacitor breakdown. A similar change could be made in Fig. 5.

As pointed out in the above-identified patent, the power-factor measuring apparatus in question is of the portable hook-on type which a person may carry about and quickly connect up and determine the power factor of any balanced three-phase circuit without opening any line. For such applications the phase rotation of the circuit is not apt to be known and, hence, the ability to determine this with the same device as is used to measure the power factor is very useful. Also as pointed out in such patent, the equipment is self-contained with all of the parts in the casing of a one-handled hook apparatus in which the current transformer core 3—4 and the wattmeter magnetic circuit 9 are combined as represented in Fig. 4. The impedance, illustrated by the condenser 22 and push button switch 23 of the present invention are also contained in and on such casing as will now be explained in connection with Fig. 4.

In the embodiment of Fig. 4, provision is made for the measurement of power factor over the complete measurement range including zero power factor. A reversing switch is not used but the different power-factor ranges are obtained by hooking the current energizing circuit over different current phases. The moving coil 14 of the wattmeter element is contained in an air gap which is directly in the hook-on magnetic circuit, and no secondary current transformer winding or stationary wattmeter coil is required. The hook-on magnetic circuit serves the multiple purpose of a hook-on current transformer and wattmeter magnetic circuit, or the primary cable over which it is hooked may be considered as the current coil of the wattmeter.

The single potentiometer is provided with three power-factor scales marked A, B and C, only scale C being indicated in Fig. 5. A coding is used (by color, for instance) to group the scales. For example, in Fig. 4 the C scale and the left half of A scale may be black, while the B scale and the right half of A scale may be red for purposes to be explained.

The scale disk 15a is rotatable and when it rotates, it likewise rotates the movable member of the potentiometer 15, Fig. 5. The scale dial is provided with an escalloped periphery to enable it to be easily rotated by the thumb of the hand of the operator grasping the handle 2, so that only one hand need be used for all operations of the apparatus including hooking it over a current-carrying cable. The scale disk 15a rotates beneath a stationary transparent sector 15b having a center vertical index mark extending over the three scales on disk 15a, and by means of which the selected power-factor scale is read. The voltage connecting terminals are represented at 24, and renewable fuses for each voltage circuit at 25. The voltage terminals are marked A, B and C to coordinate them with the power-factor scales employed. The circuit connections for use of scale C and the vector diagram of Fig. 6 are represented in Fig. 5, where it is noted that the current is coupled to current phase C, and the potentiometer resistance is connected across phases B and C and the moving coil 14 of the wattmeter between the potentiometer and voltage phase A. In Fig. 5 the stationary current coil 11 of the wattmeter is represented in a conventional way as supplied from a current transformer but it is to be understood that the actual arrangement is as described and illustrated in connection with Fig. 4.

The impedance, illustrated by the condenser 22, is contained within the casing 1 made of insulating material and provided with a handle 2. The accessible portion of the push button switch 23 is preferably placed near the upper portion of the handle as shown, where it can easily be reached and pressed to operating position with the thumb or forefinger of the hand holding the apparatus by handle 2. The use of the apparatus for measuring power factor will first be described on the assumption that the phase rotation has been determined to be counterclockwise in relation to the vector diagrams, Figs. 6, 7, and 8, and the circuit diagram, Fig. 5.

For the connection of Fig. 5, the "Lag C" scale of the potentiometer is used. Fig. 6 represents the condition for 60 degrees lagging phase C current and a zero reading of the wattmeter when the potentiometer is adjusted to the .5 power-factor right end of its resistance. Other lagging power factors between this and unity are measurable by adjusting the potentiometer towards the other end of the scale. This causes the voltage vector used to shift from AC towards AB. The power-factor graduations of the potentiometer of Fig. 5 represent the black C scale, Fig. 4.

To measure leading power factor from .5 to unity, the current circuit of the wattmeter is energized from phase B with the voltage connections remaining the same. Fig. 7 represents the vector diagram for this connection with the phase B current leading by 60 degrees and the power factor is read on the red B scale. Note that power-factor graduations on the B scale are in reverse to that of the C scale, and that for a .5 power-factor leading measurement the potentiometer will be adjusted to the left end of the resistance and the wattmeter voltage circuit energized from across phases A and B.

For power-factor measurements below .5 the current circuit is energized by shifting the hook-on magnetic circuit to embrace phase A and power factor is read on scale A. When the current is between 90 degrees and 60 degrees lagging, the current A vector will shift between the horizontal line marked "O. P. F." in Fig. 8 pointing to the right and the vector marked "A Lag," and the wattmeter will read zero for the 60-degree lag .5 power-factor condition when the potentiometer is at the left end of the scale and when the dial, Fig. 4, indicates .5 on the black end of the A scale. The wattmeter will read zero for a zero power factor when the potentiometer is at the midpoint of its resistance and scale; and the wattmeter will read zero for a .5 leading power factor when the potentiometer is at the right end of its resistance and scale, when the dial, Fig. 4, indicates .5 on the red part of scale A.

In the above description of the power-factor measurement use of the apparatus of Fig. 4, it was assumed that the phase rotation had been determined in some way and that it was counterclockwise on the vector diagrams. It is evident, however, that if the phase rotation had been clockwise, the wrong power-factor scales would have been used. It is, therefore, necessary to ascertain the phase rotation and correlate the correct phase rotation with the correct use of the apparatus. This is accomplished by the present invention by simply and momentarily closing switch 23 after the apparatus has been connected and a first power-factor measurement obtained. In such measurement the wattmeter pointer 18 has been brought to zero. The power factor should always be read on that scale which corresponds to the voltage lead marked on the line encircled with the hook 14 when the wattmeter reading has been brought to zero. Thus, if terminal 24B, Fig. 4, is connected to the line which hook 4 encircles, power factor should be read on scale B.

Now, when switch 23 is closed, the pointer 18 will deflect off zero. If the user now adjusts the potentiometer by turning dial 15a, Fig. 4, to return pointer 18 to zero and the new power-factor dial reading is greater than the first power-factor measurement, he will know that the current is leading. If this leading power factor is measured on a red scale, he will know that the apparatus as connected corresponds to counterclockwise phase rotation, and if read on a black scale, he will know that the apparatus as connected corresponds to clockwise phase rotation. On the other hand, if the new power-factor dial reading is less than the first power-factor measurement, he will know the current is lagging and if read on a black scale, the apparatus is connected for counterclockwise rotation, and if read on a red scale, he will know that the apparatus is connected for clockwise rotation. Accordingly, the red power-factor scales are marked "Lead—CCW," "Lag—CW," and the black scales are marked "Lag—CCW," "Lead—CW," as indicated in Fig. 4.

A satisfactory set of complete instructions for the use of the apparatus of Fig. 4 is as follows:

1. Connect the voltage A, B, C terminals 24 at random across the lines of the three-phase circuit to be metered.

2. Encircle a single conductor with the hook and rotate the power-factor dial until the wattmeter deflection is zero. If unable to obtain zero deflection, remove the hook, encircle one of the two remaining conductors and rotate the power-factor dial as before. If still unable to obtain zero deflection, remove the hook and close around the one remaining conductor. Zero deflection can be obtained on one of the three conductors for any possible value of power factor.

3. Note the voltage terminal marking A, B, or C on the hooked line and read the power factor magnitude only on the correspondingly marked power-factor scale.

4. To determine if power factor is leading or lagging when: (a) The phase sequence is known. If the phase sequence is counterclockwise and the power factor is read on a red scale, the power factor is leading and if read on a black scale, the power factor is lagging. If the phase sequence is clockwise and the power factor is read on a red scale, it is lagging and if read on a black scale, the power factor is leading. (b) The phase sequence is unknown. With the voltage terminals connected at random and the conductor direction random through the hook, close switch 23, Fig. 4, turn dial in a direction to reduce wattmeter deflection and note if the power-factor reading increases or decreases. Increasing power-factor reading indicates lead and decreasing reading indicates lag.

5. To determine phase sequence, a power-factor measurement must be made, lead or lag determined as in 1, 2, 3, 4 above, and the color of the scale noted. The phase sequence is then: Counterclockwise if lagging P. F. is read on any black scale. Counterclockwise if leading P. F. is read on any red scale. Clockwise if leading P. F. is read on any black scale. Clockwise if lagging P. F. is read on any red scale.

In the method of determining phase rotation and distinguishing between leading and lagging power factor as explained in connection with Fig. 4, the direction of wattmeter deflection is immaterial and, hence, no instructions are necessary and no attention need be given to the direction in which the hook 4 encircles the current-carrying conductor used. The apparatus enables determination of all values of balanced phase, balanced power factor without prior knowledge of phase rotation or phase sequence simply by, first, measuring the power-factor value and, secondly, determining whether it is leading or lagging, by closing the condenser switch and noting whether the power-factor reading increases or decreases as the wattmeter deflection is adjusted toward the new zero condition. The condenser and its switch also enable the determination of phase rotation simply by making a power-factor measurement and noting the color coding of the scale used, and whether leading or lagging power factor was measured. All measurement operations are performed with a single device held and operated by one hand.

Instead of including the condenser push button feature in the moving coil circuit, it may be placed in the circuit of a compensating winding on the field core of the wattmeter and in this case it is unnecessary to hook the apparatus over a current-carrying conductor of the three-phase line to determine the phase rotation thereof. Only the potential circuits need to be connected. This is illustrated in Fig. 9. A portion of the hook-on magnetic circuit of Fig. 4 is shown with the moving coil 14 of the wattmeter element in the air gap, and with a compensating winding 27 wound on the magnetic circuit and connected through a condenser 22 and normally open push button switch 23 to the three-phase voltage in such manner that the voltage across the compensating circuit is at right angles to the voltage on the moving coil circuit when the slider 15 is at one end of the potentiometer resistance 20.

A, B, and C represent the voltage connections to the three phases of the circuit being investigated. The potentiometer resistance is shown connected between phases C and B, and the moving coil 14 is shown connected across phases A and B. Hence, the current in the circuit of coil 14 will be inphase with the A—B voltage. The compensating coil-condenser push button circuit is connected from phase C to the midpoint of a resistance 28 connected between phase voltages A and B. Hence, the voltage designated E impressed across the latter circuit will have a phase position at right angles to the A—B voltage. When the push button switch 23 is closed, the current flowing in the circuit of the compensating winding will lead voltage E because of the condenser 22 and, hence, the fluxes of the wattmeter will be at an angle to each other which differs from 90 degrees by an amount which the compensating coil current leads the voltage E. This will produce a deflection of the wattmeter in a direction which depends upon the phase rotation of the three-phase power circuit for a given three-phase voltage connection thereto.

The vector relations are represented in Figs. 10 and 11. In these figures $I_{14}$ represents the current flowing in coil 14, and E the voltage impressed across the compensating coil circuit at 90 degrees from vector $I_{14}$. $I_{27}$, Fig. 10, represents the current and its vector relation in the compensating coil 27 when the switch 23 is closed if the phase rotation is counterclockwise; and $I_{27}$, Fig. 11, represents the current and its vector relation in compensating coil 27 if the phase rotation is clockwise. For counterclockwise rotation the wattmeter deflects down-scale with a torque represented by —T, and if clockwise the wattmeter deflects up-scale with a torque +T. In this modification the extra parts to determine phase rotation are the condenser 22, the push button switch 23, and the resistance 28. These parts occupy small space and will be housed in and on a casing corresponding to the casing 1, Fig. 4. The apparatus will otherwise be similar to that of Fig. 4. The hook 4 of the hook-on magnet circuit should be closed during the phase-rotation test but should not embrace one of the current-conducting power lines. When the hook-on apparatus is hooked over to embrace a current-carrying conductor to make a power-factor reading, it is here necessary to follow specific instructions as to the direction in which such conductor passes through the magnetic circuit from source of supply to load.

It is seen that our improvement provides for an essential measurement, at negligible added cost, and great convenience to the user. With the combined power-factor and phase-rotation meter of our invention, the user is less likely to make mistakes than in using a separate phase-rotation meter, since he has only one instrument to connect and the circuit connections for determining phase rotation and for measuring power factor are the same or essentially the same. Actually, the user of this apparatus does not need to know the phase rotation or understand its significance, since the correct use of any of the modifications described may be reduced to simple instructions which would include the push button wattmeter deflection test without any reference being made to phase rotation.

What we claim as new and desire to secure by Letters Patent of the United States is:

1. A combined power-factor meter and phase-rotation indicator for three-phase circuits, comprising a single-phase wattmeter having a stationary magnetic circuit containing an armature air gap, provisions for magnetizing such circuit in accordance with the current in one phase of a three-phase circuit, a moving coil in the armature air gap, a resistance with terminals for connecting the same across two phases of such three-phase circuits, a tap adjustable along said resistance and connected to one terminal of said moving coil, means for connecting the other terminal of said moving coil to the third phase of such three-phase circuit, a scale graduated in terms of power factor indicative of the position of said movable tap along said resistance and a circuit including an impedance of known phase-shifting characteristics, and a switch for cutting said phase shifting circuit into and out of an energizing circuit of said wattmeter when said circuit is energized as above described for power factor measurement purposes.

2. A hook-on power-factor meter and phase-rotation indicator for three-phase circuits, comprising a portable casing having a handle at one end, a magnetic circuit within said casing extending from the other end of said casing and including an external hinged section for coupling the magnetic circuit with one of the conductors of the circuit to be metered, a single-phase indicating type alternating current wattmeter in said casing adapted to have its field energized in response to the current flow in such conductor through said magnetic circuit, a resistance within said casing adapted to be connected across two of the conductors of the three-phase circuit to be metered, a pivoted tap adjustable along said resistance and connections for energizing the voltage circuit of said wattmeter from the remaining conductor of such three-phase circuit and said adjustable tap, a dial graduated in terms of power factor rotatable with the movement of said adjustable tap, and a stationary index cooperating with said dial indicative of the position of said adjustable tap along said resistance, said dial being on the outside of said casing near the casing handle whereby a person holding the casing by its handle with one hand can rotate said dial with the thumb of such hand, a circuit including a switch and an impedance of known phase-shifting characteristics in said casing associated with an energizing circuit of said wattmeter such that, with said wattmeter energized as above described for power factor measurement, when the switch is operated the phase of the current in such energizing circuit is shifted in a known direction resulting in a wattmeter deflection which is indicative of phase rotation of such three-phase circuit, and an operating member for said switch extending externally to the casing near its handle so that said switch may be operated by a thumb or finger of the hand holding the casing by its handle.

3. A power-factor meter and phase-rotation indicator for three-phase circuits, comprising a single-phase indicating type of alternating current wattmeter, said wattmeter having a magnetic field circuit and provisions for selectively exciting said field circuit by the current flowing in any one of the three phases of the circuit to be metered, voltage terminals for said apparatus for connecting to the three phases of such circuit, each terminal being marked thereon to identify the phase to which connected, a resistance connected between two of said voltage terminals, a pivoted tap adjustable along said resistance, electrical connections for energizing the voltage circuit of said wattmeter from said tap and the third voltage terminals, a rotatable dial adjustable with said tap and having three power-factor scales thereon, said scales having phase-identifying markings corresponding to the voltage terminal markings to associate each power-factor scale with the wattmeter current energizing phase to be used therewith, a stationary index for indicating on said dial the power-factor measurement when said tap is adjusted to produce a zero wattmeter indication, an impedance having a known phase-shifting characteristic, a switch and connections for associating said impedance with the voltage energizing circuit of said wattmeter when energized as above described and said switch is operated for the purpose of distinguishing between leading and lagging power-factor measurements, and markings for each of said power-factor scales to indicate the existing phase rotation for each leading and lagging power-factor measurement.

4. A combined power-factor meter and phase-rotation indicator for three-phase circuits, comprising a single-phase alternating current indicating type wattmeter, means for selectively energizing said wattmeter by current from any one of the phases of the three-phase circuit to be metered, a resistance having terminals for connection across two phases of such circuit, a tap adjustable along said resistance, connections for energizing the voltage circuit of said wattmeter from across said tap and the third phase of such circuit, a scale and indicator for indicating the position of said adjustable tap, said scale being graduated in power-factor units and indicating the power-factor measurement when said tap is adjusted for a zero wattmeter deflection, a current-limiting resistance in the voltage energizing circuit of said wattmeter, an impedance of known phase-shifting characteristics, and a switch for connecting said impedance in shunt to said current-limiting resistance for the purpose of determining the phase rotation of the power-factor measurement connection being used.

5. A combined power-factor meter and phase-rotation indicator for three-phase circuits, comprising a single-phase alternating current indicating wattmeter, means for selectively energizing said wattmeter by current from any one of the phases of the three-phase circuit to be metered, a resistance having terminals for connection across two phases of such circuit, a tap adjustable along said resistance, connections for energizing the voltage circuit of said wattmeter from across said tap and the third phase of such circuit, a scale and indicator for indicating the position of said adjustable tap, said scale being graduated in power-factor units and indicating the power-factor measurement when said tap is adjusted for a zero wattmeter deflection, an impedance having a known phase-shifting characteristic and a switch for connecting said impedance in shunt relation to the voltage energizing circuit of said wattmeter for the purpose of determining the phase rotation of the power-factor measurement connection being used.

RALPH M. ROWELL.
ARNOLD L. NYLANDER.

REFERENCES CITED

The following references are of record in the file of this patent:

UNITED STATES PATENTS

| Number | Name | Date |
|---|---|---|
| 1,641,757 | Hall | Sept. 6, 1927 |
| 2,027,864 | Hand | Jan. 14, 1936 |
| 2,503,598 | Simkins | Apr. 11, 1950 |
| 2,519,071 | Rowell | Aug. 15, 1950 |